United States Patent Office 3,083,110
Patented Mar. 26, 1963

3,083,110
DENTAL STONE
Jerome A. Preston, Toledo, Ohio, assignor to The Ransom & Randolph Company, Toledo, Ohio, a corporation of Ohio
No Drawing. Filed Feb. 13, 1961, Ser. No. 88,598
8 Claims. (Cl. 106—38.35)

This invention relates to a dental stone, and, more particularly, to a dental stone of the gypsum type which includes certain materials in limited quantities.

Gypsum is perhaps one of the first materials that was ever used to produce a mortar, and perhaps entirely by accident after dehydration in the vicinity of a fire of early man and then hydration by rainfall. In any event, the calcium sulfate hemihydrate which is formed by dehydration of natural gypsum is widely used at the present time, for example in making casts, rigid bandages, investment molds and the like. Calcined gypsums are important in a number of dental procedures. Calcined gypsum compositions are used to form molds and models on which dental prostheses and restorations are constructed. In one dental application a composition, known as dental stone, is mixed with water, poured into an impression, and allowed to set. The hardened dental stone cast of the impression then serves as a positive life-size model on which the denture may be constructed without the patient being present.

The present-day dental stone compositions are composed almost entirely of a calcined gypsum, although they also may contain small amounts of other materials. Depending upon the particular method of calcination of gypsum, there appear to be two different crystalline forms of calcium sulfate hemihydrate. The beta-hemihydrate, more popularly known as plaster of paris, is found in the form of crystals which are somewhat irregular in shape, in contrast to the crystals of the alpha-hemihydrate which are more nearly prismatic particles. The alpha-hemihydrate is the principal product formed when gypsum is calcined under steam pressure in an autoclave, usually in the presence of water, at a temperature of 120° to 130° C. This type of calcination product, chiefly the alpha-hemihydrate, is the principal constituent of the present-day gypsum-type dental stone compositions, although minute amounts of the beta-hemihydrate and even the dihydrate, although not desirable therein, may be present. In addition, the dental stone compositions frequently contain about 2 to 3 percent of various modifiers, such as accelerators and retarders which are employed for the purpose of controlling the setting time and expansion. Among the various modifiers employed in the art are potassium sulfate $K_2SO_4$, and Rochelle salt, $KNaC_4H_4O_6 \cdot 4H_2O$. Coloring matter also may be included to give the dental stone composition a distinctive appearance. The setting of the dental stone composition involves the reversal of the calcination reaction. In setting, water admixed with the dental stone reacts with the calcium sulfate hemihydrate with heat being evolved and gypsum (calcium sulfate dihydrate) being formed. The text, The Science of Dental Materials, by E. W. Skinner, 1954, W. B. Saunders Company, and references cited therein, and in particular pages 40–46 of the text, are illustrative of teachings and techniques used in dental stone applications.

Numerous compounds and materials are used in the dental art to make impressions, e.g. of an oral cavity or a portion thereof (i.e. upper mouth, lower mouth, teeth, and the like) to provide a life-size negative model which then is used to prepare a positive model from a dental stone. Impression materials and compounds, forming rigid nonelastomeric impressions, are best suited for impressions of edentulous mouths and for use in complete denture prosthesis. On the other hand elastomeric materials, although useful for edentulous impressions, are used most extensively in crown and bridge, partial denture and operative dentistry, where impressions of teeth are included. The elastomeric impression materials possess a number of advantages over materials which form rigid, nonelastomeric impressions. For example, in the case of a hardened plaster impression, undercuts prevent the removal of the impression without distortion or fracture. Generally, in the event of an undercut, a plaster impression is fractured intentionally and removed in pieces for later reassembly and preparation therefrom of a dental stone cast. Elastomeric materials deform to enable removal over an undercut, but provide accurate impressions. Among elastomeric materials used are hydrocolloid impression materials which possess the property of changing to an elastomeric jelly or gel under certain conditions. A convenient classification of these hydrocolloid impression materials is based on whether the gel is reversible or irreversible in character. Gelatin and agar-agar are illustrative of the reversible hydrocolloid impression materials which go to the sol upon heating and return to the gel upon cooling. Alginates are examples of sols which can be changed to gels which are irreversible in the sense that the gel cannot be reversed to the sol by simple means. Usually, the irreversible gelation of hydrocolloids is by a chemical reaction such as that of the well-known alginate impression materials. In these alginate impression materials, a soluble alginate, such as sodium or potassium alginate, reacts with a calcium compound, such as calcium sulfate dihydrate, to produce an insoluble gel form (i.e. calcium alginate). Illustrations of further teachings and techniques for the hydrocolloid dental impression materials are found on pages 61–84 of the aforementioned text.

It has been found that many of the commonly used elastomeric impression materials prevent, for reasons which are not fully understood, a satisfactory hardening of the dental stone material at the interface between the dental stone and the elastomer. This phenomenon is particularly serious in the art because the interface, i.e. the surface of the dental stone, which is prevented from hardening is that which determines the final shape of the article to be produced therefrom. When this surface is comparatively soft, as is ordinarily the case in dental stone casts produced from calcium sulfate hemihydrate against a calcium alginate impression, the preparation of dentures and the like with good surface properties is an impossibility because the soft surface, in effect, acts as a rough surface.

The dental art has recognized that a hard surface and a strong dental stone cast are important. Often a wax pattern, which is later to be reproduced, is carved while in position after having been poured in the cast and solidified. In such an event, the dental stone cast must be strong and have a hard surface in order not to be broken during handling and abraded by the carving instrument. One reason why alpha calcium sulfate hemihydrate is used in dental stone compositions instead of the beta-hemihydrate of gypsum is that higher compressive strengths are obtainable. Dental stone casts have been soaked in borax solutions to increase surface hardness. Hydrocolloid impressions have also been electroplated with copper and the electroplated layer reinforced by a dental stone cast to thus prepare the desired positive model. Another method to prevent a soft surface on the dental stone cast has been to immerse the impression in a hardening solution just prior to casting the dental stone. Apparently in some not fully understood manner the hardening solutions, depending on the particular chemical and its concentration, increase the hardness of the surface of the dental stone cast. However, such known remedies are indirect approaches to increase the hardness of the surface of the dental stone cast. A direct modification of the dental stone composition so as to include materials therein which increase the surface hardness would be particularly desirable. A calcium sulfate hemihydrate composition which can be converted to a dihydrate having an improved ultimate compressive strength by comparison with presently available hemihydrates would also be desirable, particularly in the dental stone art.

The present invention is based upon the discovery of an improved composition which comprises alpha calcium sulfate hemihydrate and urea or thiourea in certain proportions. Such composition can be hydrated to produce a dental stone cast or the like having improved ultimate compressive strength, by comparison with a composition consisting essentially of alpha calcium sulfate hemihydrate. The present invention also includes the improved composition which consists essentially of alpha calcium sulfate hemihydrate, urea or thiourea in certain proportions, and hydrazine sulfate or strychnine sulfate in certain proportions. This composition has an improved ultimate compressive strength and can be hydrated in contact with an alginate colloid generally with an appreciable gain in surface hardness at the interface between the calcium sulfate cast and the colloid. Advantageously with a composition of the invention, the dental stone cast may be removed from an impression sooner than possible with prior art compositions because a high surface hardness is attained in a shorter period of time.

It is, therefore, an object of the invention to provide an improved composition comprising alpha calcium sulfate hemihydrate.

Other objects and advantages will be apparent from the description which follows, which is intended only to illustrate and disclose, but in no way to limit, the invention.

According to the invention an improved composition is provided. Such composition comprises 100 parts [1] of alpha calcium sulfate hemihydrate, and from about 0.01 to about 3 parts of urea, thiourea or both combined. A preferred composition according to the invention consists essentially of about 100 parts of alpha calcium sulfate hemihydrate, from about 0.01 to about 3 parts of urea, thiourea or both combined, and from about 0.001 to about 4 parts of hydrazine sulfate, strychnine sulfate, or both combined.

It has been found that the particle size of the alpha calcium sulfate hemihydrate that is employed is an important factor in producing gypsum-type dental stone. For optimum results, substantially all of the alpha calcium sulfate hemihydrate should be finer than 200 mesh [2] and from about 96 percent to about 97.2 percent should be finer than 325 mesh. It has also been found that limited amounts of $TiO_2$, e.g. as anatase, rutile, or the like can be incorporated to advantage in a composition according to the invention. One function of the added $TiO_2$ is to serve as coloring matter to noticeably whiten the dental stone. For this purpose preferably there is employed a blend of substantially equal parts of anatase and rutile. Ordinarily, the $TiO_2$, if employed, should amount to from about 0.1 to about 10 parts for each 100 parts of the alpha calcium sulfate hemihydrate, most desirably from about 3 to about 6 parts. The $TiO_2$ is inert in the sense that it affects neither the surface hardness adjacent a colloid such as an alginate, nor the ultimate compressive strength when employed in the indicated proportions.

The reason for the improved ultimate compressive strengths and surface hardness, as indicated, achieved using compositions according to the invention, is not understood. It is known that the hardening of calcium sulfate hemihydrate involves a hydration, and that the end product of the hydration is the dihydrate. The presence of strychnine sulfate or hydrazine sulfate must prevent an interference which would otherwise occur at the interface between the mold material and an alginate colloid, for example, but neither the mechanism of the interference nor the mechanism of the prevention of the interference is understood. Both urea and thiourea are believed to alter the nature of the hydration to cause greater hardness, but the mechanism is not known.

The following examples are presented solely for the purpose of further illustrating and disclosing the invention, and are in no way to be construed as limitations thereon.

EXAMPLE 1

A dry dental stone composition suitable for use in preparing dental stone casts was made by mixing 94 grams of chemically pure alpha calcium sulfate hemihydrate, 1.8 grams of potassium-sodium tartrate, 5.2 grams of $TiO_2$ which was a blend of substantially equal parts of anatase and rutile, 0.8 gram of thiourea and 0.3 gram of hydrazine sulfate. The calcium sulfate and the $TiO_2$ were both in a finely ground condition. One hundred percent passed through a 100 mesh screen; from 99.8 percent to 100 percent [3] passed through a 200 mesh screen, and from 96 percent to 97.2 percent [3] passed through a 325 mesh screen. The above-defined composition is hereinafter referred to as "formulation 1." Various other formulations according to the invention have also been prepared. Typical compositions which have been so produced are presented in the following table wherein proportions are in parts by weight:

*Table I*

| Formulation | Alpha calcium sulfate hemihydrate | $TiO_2$ | Urea | Thiourea | Hydrazine sulfate | Strychnine sulfate | Potassium sodium tartrate |
| --- | --- | --- | --- | --- | --- | --- | --- |
| 2 | 96.0 | 3.8 | 0.2 | | | 0.215 | 1.8 |
| 3 | 96.0 | 3.8 | | 0.8 | | | 1.8 |
| 4 | 96.0 | 3.8 | | 0.8 | 0.3 | | 1.8 |
| 5 | 96.0 | 3.8 | | 1.0 | 0.3 | | 1.8 |
| 6 | 96.0 | 3.8 | | 2.0 | 0.3 | | 1.8 |
| 7 | 96.0 | 3.8 | | 3.0 | 0.3 | | 1.8 |
| 8 | 96.0 | 3.8 | | 0.8 | 1.0 | | 1.8 |
| 9 | 96.0 | 3.8 | | 0.8 | 2.0 | | 1.8 |
| 10 | 96.0 | 3.8 | | 0.8 | 3.0 | | 1.8 |
| 11 | 96.0 | 3.8 | | 0.8 | 4.0 | | 1.8 |
| Control | 96.0 | 4.0 | | | | | 1.8 |

The formulations identified above were mixed well with water and used to produce casts which were subjected to various tests to determine surface hardness after hydration in contact with glass, and to determine ultimate compressive strength and surface hardness after hydration in contact with an alginate colloid gel which consisted essentially of calcium alginate. In all cases, the formulations were mixed with water in proportions of substantially 100 parts to 26 parts, respectively. The surface hardness tests were performed with a Rockwell hardness tester equipped with a 1 inch ball, with no load, and using the B scale. The ultimate compressive strengths are expressed in pounds per square inch and were determined by the conventional ASTM method. The results of typical tests are presented in Tables II, III and IV, below:

*Table II*

ROCKWELL HARDNESS, SURFACE CURED AGAINST GLASS

| Formulation | After 20 minutes | 30 minutes | 1 hour | 2 hours | 24 hours |
| --- | --- | --- | --- | --- | --- |
| 1 | 96 | 106 | 116 | 118 | 121 |
| 2 | 88 | 97 | 105 | 116 | 119 |
| 3 | 96 | 106 | 116 | 118 | 121 |
| 4 | 97 | 107 | 120 | 120 | 121 |
| Control | 0 | 76 | 98 | 98 | 115 |

---

[1] The terms "percent" and "parts," as used herein, refer to percent and parts by weight, unless otherwise indicated.
[2] Mesh sizes, as reported herein refer to the U.S. sieve series, unless otherwise indicated.
[3] The ranges in percentages are based upon different analyses of the sample, and may reflect variations in the sample, experimental error, or both.

Table III

SURFACE HARDNESS AFTER HYDRATION IN CONTACT WITH THE ALGINATE COLLOID GEL

| Formulation | After 20 minutes | 30 minutes | 1 hour | 2 hours | 3 hours |
|---|---|---|---|---|---|
| 1 | 91 | 101 | 104 | 118 | 118 |
| 2 | 84 | 97 | 100 | 107 | 116 |
| 3 | 35 | 60 | 93 | 97 | 112 |
| 4 | 90 | 104 | 106 | 120 | 120 |
| 5 | | 106 | 108 | | |
| 6 | | 106 | 108 | | |
| 7 | | 60 | 76 | | |
| 8 | | 87 | 89 | | |
| 9 | | 87 | 85 | | |
| 10 | | 84 | 83 | | |
| 11 | | 77 | 81 | | |
| Control | 0 | 77 | 94 | 94 | 110 |

Table IV

ULTIMATE COMPRESSIVE STRENGTH [1]

| Formulation | ½ hour | 1 hour | 2 hours | 24 hours | 7 days |
|---|---|---|---|---|---|
| 1 | | 5,800 | 6,100 | 7,500 | 10,800 |
| 2 | | 5,910 | 6,210 | 7,590 | 10,950 |
| 3 | | 5,800 | 6,100 | 7,500 | 10,800 |
| 4 | | 5,710 | 6,200 | 7,900 | 13,600 |
| 5 | 5,650 | 5,350 | | | |
| 6 | 5,450 | 5,630 | | | |
| 7 | 4,200 | 3,850 | | | |
| Control | 3,300 | 4,400 | 4,987 | 5,494 | 9,028 |

[1] Pounds per square inch.

It will be noted that a limited amount of a hydration accelerator, sodium potassium tartrate, was employed in each of the compositions identified above. This is advantageous, and, therefore, preferred, but is not an essential feature of the instant invention. The advantages discussed above are realized either with or without the sodium potassium tartrate. Similarly, other hydration accelerators, such as sodium sulfate or potassium sulfate, or hydration retarders, such as sodium citrate, can be employed as desired or required, and without affecting the indicated advantages.

It will be apparent from the foregoing examples that optimum results are achieved for each 100 parts of alpha calcium sulfate hemihydrate when the parts of urea, thiourea, or both combined, range from about 0.05 to about 2, but that significant advantage is achieved when the parts are as low as 0.01, or as high as 3. Even larger amounts can be employed, but, in essence, act as diluents and are less desirable. Similarly, significant advantages from hydrazine sulfate, strychnine sulfate, or both combined are achieved when the parts thereof for each 100 parts of calcium sulfate hemihydrate range from about 0.001 to about 4, while optimum results are achieved when the parts range from about 0.05 to about 1½. Likewise, more than about 4 parts of strychnine sulfate or hydrazine sulfate acts as a diluent, so that results are less desirable.

It will be apparent that various changes and modifications can be made from the specific details set forth herein without departing from the spirit and scope of the invention as defined in the appended claims.

What I claim is:

1. A composition consisting essentially of 100 parts of finely ground alpha calcium sulfate hemihydrate, from 0.1 to 10 parts of finely ground $TiO_2$, from about 0.05 to about 2 parts of thiourea and from about 0.05 to about 1½ parts of strychnine sulfate.

2. A composition consisting essentially of 100 parts of finely ground alpha calcium sulfate hemihydrate, from 0.1 to 10 parts of finely ground $TiO_2$, from about 0.05 to about 2 parts of thiourea and from about 0.05 to about 1½ parts of hydrazine sulfate.

3. A composition consisting essentially of 100 parts of finely ground alpha calcium sulfate hemihydrate, from 0.1 to 10 parts of finely ground $TiO_2$, from about 0.05 to about 2 parts of urea and from about 0.05 to about 1½ parts of strychnine sulfate.

4. A composition consisting essentially of 100 parts of finely ground alpha calcium sulfate hemihydrate, from 0.1 to 10 parts of finely ground $TiO_2$, from about 0.05 to about 2 parts of urea and from about 0.05 to about 1½ parts of hydrazine sulfate.

5. A composition consisting essentially of 100 parts of finely ground alpha calcium sulfate hemihydrate, from 0.1 to 10 parts of finely ground $TiO_2$, from about 0.05 to about 2 parts of at least one member selected from the group consisting of urea and thiourea and from about 0.05 to about 1½ parts of at least one member selected from the group consisting of hydrazine sulfate and strychnine sulfate.

6. A composition consisting essentially of 100 parts of finely ground alpha calcium sulfate hemihydrate, from about 0.01 to about 3 parts of at least one member selected from the group consisting of urea and thiourea and from about 0.01 to about 4 parts of at least one member selected from the group consisting of hydrazine sulfate and strychnine sulfate.

7. A composition consisting essentially of 100 parts of finely ground alpha calcium sulfate hemihydrate and from about 0.01 to about 3 parts of at least one member selected from the group consisting of urea and thiourea.

8. The composition of claim 7 which also contains from 0.1 to 10 parts of a blend of substantially equal parts of anatase and rutile finely ground $TiO_2$ and from about 0.05 to about 1½ parts of at least one member selected from the group consisting of hydrazine sulfate and strychnine sulfate.

References Cited in the file of this patent

UNITED STATES PATENTS

| 2,191,555 | Berliner | Feb. 27, 1940 |
| 2,239,925 | McKee et al. | Apr. 29, 1941 |